United States Patent

[11] 3,564,970

[72] Inventor Charles A. Larsen
 Union Grove, Wis.
[21] Appl. No. 815,455
[22] Filed Apr. 11, 1969
[45] Patented Feb. 23, 1971
[73] Assignee Gorton Machine Corporation
 Racine, Wis.

[54] METAL WORKING MACHINE OR THE LIKE HAVING ADJUSTABLE BEARING ASSEMBLIES BETWEEN RELATIVELY MOVABLE PARTS
8 Claims, 4 Drawing Figs.

[52] U.S. Cl. .................................................... 90/14, 308/6
[51] Int. Cl. ................................................... B23c 1/00, F16c 29/06
[50] Field of Search .......................................... 308/6, (GA); 90/14

[56] References Cited
UNITED STATES PATENTS
3,245,731 4/1966 Erikson .................. 308/6C Primary Examiner—Fred C. Mattern, Jr.
Assistant Examiner—Frank Susko
Attorney—James E. Nilles ABSTRACT: A machine having relatively movable parts with antifriction bearing assemblies located between the moving parts. The antifriction bearing assemblies are adjustably mounted by double wedge means whereby the proper amount of preload on the bearing assemblies can be readily obtained. In addition to the double wedge adjustment, the bearing assemblies can also be mounted so as to rock or tilt, within limits, to then thereby adapt themselves between the relatively moving parts to accommodate any misalignment and to facilitate assembly of the relatively movable parts.

Inventor:
Charles A. Larsen
By: James E. Nilles
Attorney (1)

METAL WORKING MACHINE OR THE LIKE HAVING ADJUSTABLE BEARING ASSEMBLIES BETWEEN RELATIVELY MOVABLE PARTS

BACKGROUND OF THE INVENTION

The invention pertains to metal working machines or the like which have saddles or work carrying tables that are slideable on precisely finished ways so as to move the work piece relative to the tool. Such machines also have a vertically movable head which carries a tool spindle. Various antifriction bearing devices have been proposed for mounting these moving parts to thereby carry the considerable load imposed on them, and to provide smooth and accurate movement.

Conventional bearing assemblies have been used for so mounting these saddles, tables, or heads, and an example of such a bearing assembly is shown in the U.S. Pat. No. 3,003,828, issued Oct. 10, 1961.

While these prior art devices have been satisfactory in many respects, the use of such bearing assemblies has had some shortcomings, for example, the inability to be able to precisely adjust the bearing assembly between the parts so as to insure precise movement of the movable part. It has also been difficult in these prior devices to be able to quickly and accurately measure the amount of preload placed on these bearing assemblies, due for one thing, to the lack of space to obtain such an adjustment. Furthermore, these bearing assemblies have been difficult to properly install between the relatively movable parts so that any misalignment between the parts could be provided for, and it has been difficult to assemble these parts and keep the bearing assembly in its proper position while doing so.

SUMMARY OF THE INVENTION

The present invention provides a machine having relatively movable parts and in which antifriction bearing assemblies are provided between the parts, these bearing assemblies being mounted by double wedge adjustment means. The arrangement is such that the bearing assembly can be accurately adjusted between the parts to eliminate any play therebetween, and also to preload the bearing assemblies with the desired amount of loading. A more specific aspect of the invention relates to the use of cap bolts or the like at one end of one of the double wedge members, whereby the torque necessary, applied by the tightening wrench, together with the mechanical advantage derived from the double wedge adjustment can be calculated into terms of proper preload on the bearing assembly. These cap bolts are accessible from the outside of the machine.

Another aspect of the invention relates to the mounting of a bearing assembly in a machine tool by means of a double wedge adjustment and in addition, the bearing assembly is mounted in such a manner that it can tilt to a certain extent and thereby accommodate any misalignment or play between the relatively movable parts. This aspect of the invention is particularly desirable in mounting a vertically movable spindle carrying head on vertical ways, where the spindle axis must be adjusted to a perpendicular position relative to the table.

These and other objects and advantages of the invention will appear hereinafter as this disclosure progresses, reference being had to the accompanying drawings.

DESCRIPTION OF A PREFERRED EMBODIMENT

The machine in general includes a main frame F having a bed B with horizontal ways W on which the saddle S reciprocates. A work holding table T is reciprocably mounted in a transverse direction on ways W1 of the saddle. A head H is also provided for vertical movement along vertical ways W2 to carry the tool spindle TS toward and away from the work on the table.

This general arrangement of parts is conventional and it is important that the relatively movable parts can move positively and with precision and furthermore, with a minimum amount of friction.

Bearing assemblies BA are provided between the table and the saddle ways W1, between the saddle and bed ways W, and also between the head and the vertical ways W2.

Fourteen such bearing assemblies are provided between the saddle and the bed, eight of these assemblies being mounted in vertically opposed pairs on the two outer ways so that six assemblies, two on each of the three ways, carry the weight of the saddle in a downward direction and four assemblies are located underneath the two outer ways so as to take any upward thrust on the saddle.

Furthermore, four bearing assemblies are mounted in opposing pairs on the side of the center way to prevent the saddle from twisting.

Ten of these assemblies are disposed between the table and the saddle, two pairs being opposed horizontally to prevent horizontal twisting of the table.

Figure 4:
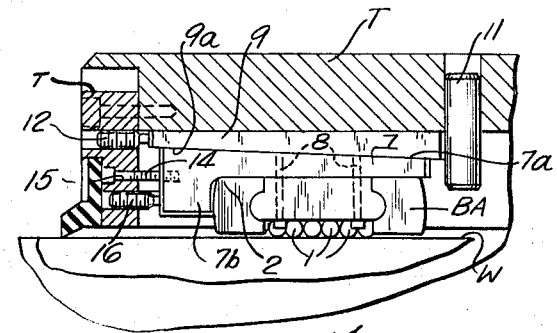
FIG. 4 is a sectional view taken along line 4—4 in FIG. 2.

As these bearings are all mounted in a similar manner, only one of them will be described and particular reference will now be made to the mounting shown in FIG. 4.

The bearing assembly has a series of hardened, steel rollers 1 which are adapted to travel in an endless path. These rollers protrude slightly from one side of the assembly so as to rest directly on the smooth and accurately finished adjacent ways. The other side 2 of the assembly is flush, that is to say, the rollers do not protrude above it, and is adapted to be rigidly secured to a wedge 7 by means of cap screws 8. If a further description of the bearing assembly itself is deemed to be either necessary or desirable, reference may be had to the said U.S. Pat. No. 3,003,828. However, it is believed sufficient to say for purposes of this disclosure that these bearing assemblies are capable of carrying extreme loads and in a comparatively frictionless manner.

In accordance with the present invention, the bearing assemblies BA are each mounted by a pair of wedges 7 and 9 which have oppositely facing, inclined surfaces 7a and 9a, that can be slid against one another to vary the height of the combined wedge. As mentioned, wedge 7 is rigidly secured to the flush side of the bearing assemblies BA and this wedge member has a protruding portion 7b against which one end of the bearing assembly firmly abuts. The other wedge 9 bears against the table T or other relatively movable part, and is rigidly but detachably located between a fixed pin 11 at one end and an adjustable set screw 12 engaging the other end of the wedge.

Referring again to the wedge 7, a locking screw means 14 is threadably engaged in the wedge and also extends through a counter-bore hole 15 in the part on which the assembly is mounted. An adjusting screw 16 also extends through the part and abuts against the end of the wedge 7. In this manner, one of the wedges 9 is rigidly fixed in position against the part and can be readily removed by loosening the set screw 12. The other wedge 7 can be readily adjusted in a longitudinal direction along the length of the adjacent wedge 9, carrying with it the bearing assembly BA. This adjustment can be accurately made by the adjusting screw 16 and after the adjustment the wedge is locked in place by tightening the cap screw 14.

In this manner, the space between the table or other movable part and the way of the relatively stationary part can be accommodated by being able to vary the thickness of the combined wedges and consequently, the pressure placed on the bearing assembly. That is to say, the amount of preload on the antifriction bearing assembly can be determined by the torque wrench (not shown) which is used to tighten the adjusting screw 16. The mechanical advantage of the double wedge is known and this advantage together with the torque reading of the wrench can be used to determine the amount of load which is desired to be placed on the bearing assembly. The outer end of the adjusting screw 16, which is adapted to receive the torque wrench is exposed to the outside of the machine for easy access by the wrench.

The entire bearing assembly and wedge arrangement can be readily removed for cleaning, repair, or replacement, and the preload adjustment can be readily and accurately made.

FIG. 3 MODIFICATION

Figure 1:
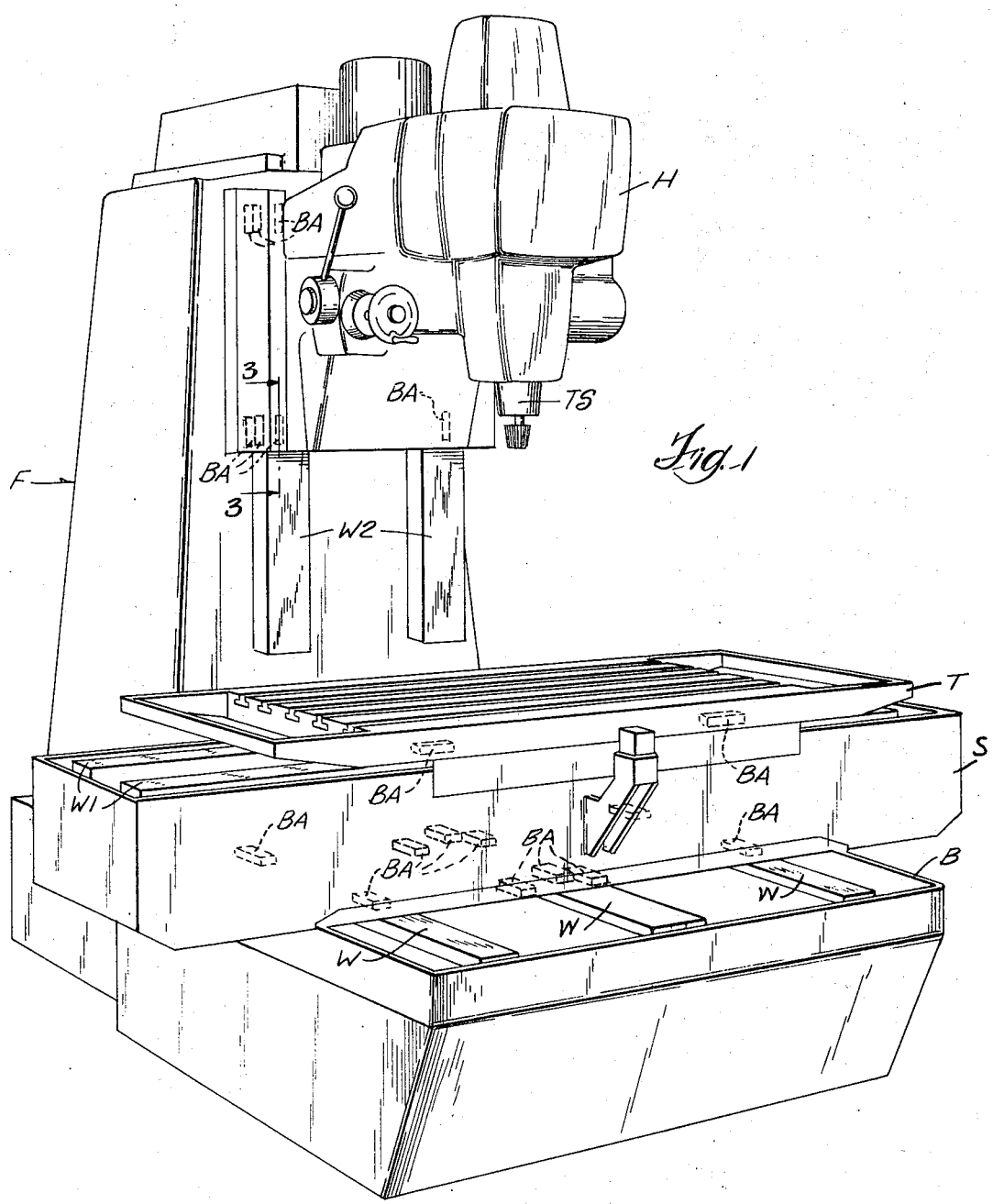
FIG. 1 is a perspective view of a machine embodying the present invention.
Figure 2:
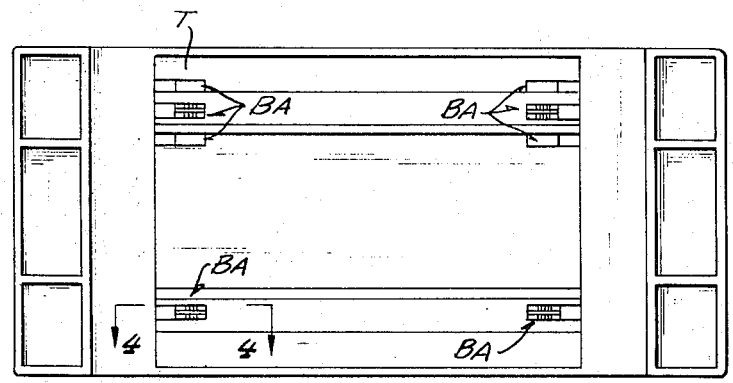
FIG. 2 is a bottom view of the table shown in FIG. 1.
Figure 3:
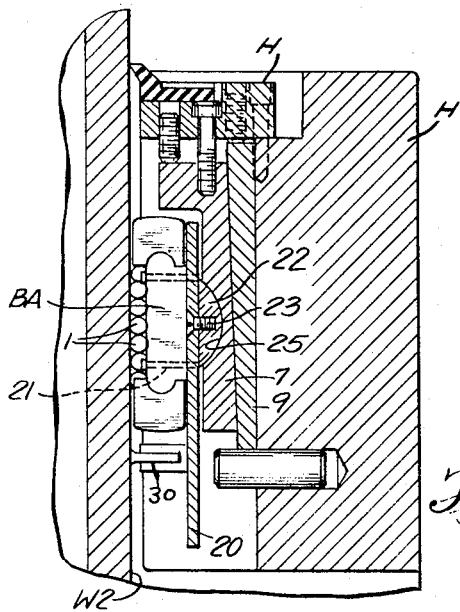
FIG. 3 is a sectional view taken along line 3—3 in FIG. 1, but on an enlarged scale, and showing the tilting mounting means of a bearing assembly.

Referring now to the embodiment of the invention as shown in FIG. 3, which is particularly desirable in a vertically movable part such as a spindle head, and the disposition of these assemblies is shown in FIG. 1. Twelve assemblies are provided, arranged in four sets of three assemblies which embrace the vertical ways on three sides. These bearing mountings are generally the same as shown in FIG. 4, with the exception that additional means, to be described, are provided for permitting the bearing assembly to tilt, that is to say, to change its angular position slightly relative to the adjacent parts. This tilting of the bearing assembly permits the spindle on the head to be accurately adjusted at a precise right angle to the table, and at the same time precise preloading of the assembly can be obtained. The bearing assembly BA is secured to a hardened, steel plate 20 by means of screws 21 and an arcuate piece 22 is secured to the plate 20 by screw means 23. This arcuate piece is mounted centrally along the length of the bearing assembly BA and sets in a complementary shaped arcuate recess 25 that is formed in the surface of the wedge 7.

With this arrangement, the bearing assembly together with the plate 20 on which it is mounted can tilt in the head and within limits, so that the rollers of the bearing assembly lay properly against the adjacent ways W2, after the spindle has been precisely adjusted at a right angle to the table by shifting one end of the head toward or away from its ways.

The plate 20 carries a wiper removable seal 30 which not only keeps foreign matter from the bearings, but also acts to aid in the assembly of the head on the ways W2 by first contacting the ways as the head is slid thereon, thus helping to keep the bearing assembly properly positioned while the head is being assembled on the vertical ways.

RESUME

By means of the present invention, a mounting for a bearing assembly has been provided between relatively moving parts of a machine, and this mounting can be readily and accurately adjusted to a predetermined load limit of the bearing assembly. Furthermore, the bearing assembly can be mounted on such a double wedge adjustment and is also able to tilt to not only accommodate any production or assembly inaccuracies between the relatively movable parts, but also to facilitate adjustment and alignment between the parts.

I claim:

1. A machine comprising, two relatively moving parts, an antifriction bearing assembly between said parts and having rollers engageable with one part for rolling thereon, adjustable means for rigidly mounting said assembly to the other part, said adjustable means comprising, a pair of wedges which are in engagement with and slideable relative to one another, one wedge being rigidly secured to said other part, the other wedge being rigidly secured to said bearing assembly, adjusting means between said other part and said other wedge, whereby said other wedge and its bearing assembly can be adjusted relative to said one wedge, said adjusting means comprising a set screw mounted in said other part and threadably engaged in one end of said other wedge, said set screw having a head adapted to receive a torque wrench, said head being exposed at the outside of said machine for engagement by said wrench, and means including a fixed pin at one end of said one wedge and an adjusting screw at the other end of said one wedge for detachably and rigidly securing said one wedge to said other part.

2. A metal working machine comprising, a stationary part and a movable part for movement adjacent and relative to said stationary part, an antifriction bearing assembly located between said parts and mounted on said movable part and having rollers engageable with said stationary part for rolling thereon, a pair of wedges each having an inclined surface which are in engagement with and slideable relative to one another, one wedge being rigidly but detachably secured to said movable part, the other wedge having means for being rigidly but detachably secured to said bearing assembly, and adjusting means between said movable part and said other wedge and comprising a set screw mounted in said other part and threadably engaged in one end of said other wedge, set screw having a head adapted to receive a torque wrench, said head being exposed at the outside of said machine for engagement by said wrench, whereby the said other wedge and its bearing assembly can be adjusted relative to said one wedge, whereby the loading on said bearing assembly between said parts can be varied.

3. A machine comprising, two relatively moving parts, an antifriction bearing assembly between said parts and having rollers along one side which are engageable with one part for rolling thereon, said assembly having an arcuate piece secured to its other side, adjustable means for rigidly mounting said assembly to the other part, said adjustable means comprising, a pair of wedges in engagement with and slideable relative to one another and for tiltably mounting said assembly to said other part, one wedge being rigidly but detachably secured to said other part, the other wedge having an arcuate recess therein which is complementary to and receives said arcuate piece for tiltably supporting said bearing assembly relative to said other part, and adjusting means between said other part and said other wedge whereby the latter and its bearing assembly can be adjusted relative to said one wedge to vary the loading on said bearing assembly between said relatively movable parts.

4. The arrangement set forth in claim 3 further characterized in that said adjusting means comprises a set screw mounted in said other part and threadably engaged in one end of said other wedge.

5. The device of claim 4 further characterized in that said set screw has a head adapted to receive a torque wrench, said head being exposed to the outside of said machine for engagement by said wrench.

6. A metal working machine comprising, main frame having vertical ways, a head mounted on said ways for vertical movement, said head having a tool carrying spindle, an antifriction bearing assembly between said ways and said head and having rollers along one side which are engageable with said ways for rolling therealong, said assembly having an arcuate piece secured to its other side, adjustable means for rigidly mounting said assembly to said head, said adjustable means comprising, a pair of wedges in engagement with and slideable relative to one another and for tiltably mounting said head to said ways, one wedge being rigidly but detachably secured to said head, the other wedge having an arcuate recess therein which is complementary to and receives said arcuate piece for tiltably supporting said bearing assembly, and adjusting means between said head and said other wedge whereby the latter and its bearing assembly can be adjusted relative to said one wedge to vary the loading on said bearing assembly between said head and ways.

7. The arrangement set forth in claim 6 further characterized in that said adjusting means comprises a set screw mounted in said other part and threadably engaged in one end of said other wedge.

8. The device of claim 7 further characterized in that said set screw has a head adapted to receive a torque wrench, said head being exposed at the outside of said machine for engagement by said wrench.